United States Patent [19]

Ooya et al.

[11] 3,769,595
[45] Oct. 30, 1973

[54] PROCESS AND CIRCUIT ARRANGEMENT FOR THE DISCRIMINATION OF MUTUAL REVOLUTIONAL SPEEDS OF A PLURALITY OF REVOLVING MEMBERS

[75] Inventors: Junichiro Ooya; Katsuki Takayama; Kazutaka Kuwana, all of Kariya City, Japan

[73] Assignee: Aisin Seiki Kabushiki Kaisha, Kariya, Japan

[22] Filed: Dec. 1, 1971

[21] Appl. No.: 203,560

[30] Foreign Application Priority Data
Dec. 1, 1970 Japan.............................. 45/106578

[52] U.S. Cl............................... 328/133, 307/233
[51] Int. Cl. ........................................... H03b 3/04
[58] Field of Search..................... 307/233, 203, 231;
328/133, 1, 140, 109

[56] References Cited
UNITED STATES PATENTS
3,644,721  2/1972  Preiser................................ 328/133
3,610,954  10/1971  Treadway .......................... 307/233
3,259,800  7/1966  Evans.................................. 308/133

Primary Examiner—John W. Huckert
Assistant Examiner—Ro E. Hart
Attorney—Richard C. Sughrue et al.

[57] ABSTRACT

The invention relates to a rotational speed descriminator determining occasional speed differences among several rotating members, such as automotive front and rear wheels.

The main feature resides in the detection of two or more speed-responsive pulse signals of a first signal series as measured between two successive pulse signals belonging to a second series of speed responsive pulse signals.

9 Claims, 22 Drawing Figures

| FLIP-FLOP | Q TERMINAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 201 | Q- " " | L | H | L | H | L | H | L | H | L | H | L | H | L | H | L | H |
| " " | Q̄- " " | H | L | H | L | H | L | H | L | H | L | H | L | H | L | H | L |
| 202 | Q- " " | L | L | H | H | L | L | H | H | L | L | H | H | L | L | H | H |
| " " | Q̄- " " | H | H | L | L | H | H | L | L | H | H | L | L | H | H | L | L |
| 205 | Q- " " | L | L | L | L | H | H | H | H | L | L | L | L | H | H | H | H |
| " " | Q̄- " " | H | H | H | H | L | L | L | L | H | H | H | H | L | L | L | L |
| 207 | Q- " " | L | L | L | L | L | L | L | L | H | H | H | H | H | H | H | H |
| " " | Q̄- " " | H | H | H | H | H | H | H | H | L | L | L | L | L | L | L | L |

FIG. 17

| | NAND-ELEMENT 204 | | | | NAND-ELEMENT 203 | | | | NAND-ELEMENT 206 | | | |
|---|---|---|---|---|---|---|---|---|---|---|---|---|
| | INPUT | | OUTPUT | | INPUT | | OUTPUT | | INPUT | | OUTPUT | |
| 0 | H | H | H | H | L | L | H | H | H | H | H | L | |
| 1 | L | H | H | H | H | H | H | H | L | H | H | L | |
| 2 | H | L | H | H | H | L | L | H | H | L | H | H | |
| 3 | L | L | H | H | H | L | H | H | H | L | H | H | |
| 4 | H | H | L | H | H | L | H | L | H | H | H | H | |
| 5 | L | H | L | H | H | H | L | H | H | H | H | H | |
| 6 | H | L | L | H | L | L | L | H | H | L | L | H | |
| 7 | L | L | L | H | H | H | L | L | H | H | L | H | |
| 8 | H | H | H | L | H | L | H | L | H | H | L | H | |
| 9 | L | H | H | L | H | H | H | L | H | H | L | H | |
| 10 | H | L | H | L | H | L | L | H | L | H | L | H | |
| 11 | L | L | H | L | H | L | H | L | L | H | L | H | |
| 12 | H | H | L | L | H | L | H | L | H | H | L | H | |
| 13 | L | H | L | L | H | H | H | L | L | H | L | H | |
| 14 | H | L | L | L | H | L | L | L | H | L | L | H | |
| 15 | L | L | L | L | H | H | L | L | L | H | L | H | |

FIG. 18

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TERM. Q OF FLIP-FLOP 209 | L | H | L | H | L | H | L | H | L | H | L | H | L | H | L | H |
| ″ ″ 210 | L | L | H | H | L | L | H | H | L | L | H | H | L | L | H | H |
| ″ ″ 211 | L | L | L | L | H | H | H | H | L | L | L | L | H | H | H | H |
| ″ ″ 212 | L | L | L | L | L | L | L | L | H | H | H | H | H | H | H | H |

Q-TERM. OF FLIP-FLOP 208

Q̄- " "

OUTPUT OF NAND-ELEM. 225

" " 217

PROCESS AND CIRCUIT ARRANGEMENT FOR THE DISCRIMINATION OF MUTUAL REVOLUTIONAL SPEEDS OF A PLURALITY OF REVOLVING MEMBERS

This invention relates to a process and a circuit for descriminating mutual higher and lower speeds of a plurality of rotating members.

The conventional analogue technique serving for the above purposes has frequently utilized so-called F-V converter means adapted for converting the rotations or frequencies of the rotating members into corresponding electrical voltages and these converted voltages are compared in their respective values, so as to discriminate the relative higher and lower revolutional speeds of the members.

In the digital type technique, there is provided counting means which are adapted for counting revolution-responsive pulses appearing during a certain time period as determined by a definite number of clock pulses so as to determine respective rotational speeds of the rotating members by mutual comparison of these revolution-responsive pulses.

In these conventional means, it is necessary to provide means for determining the rotational speeds of the rotating members which requires a very complex circuit arrangement and produces a rather inferior responding performance, even if the problem of rather higher manufacturing costs has been omitted from consideration.

The main object of the present invention is to provide a method as well as circuitry for obviating the aforementioned conventional drawbacks.

This and further objects, features and advantages of the invention will become more apparent by reading the following detailed description of the invention with reference to the accompanying drawings illustrative of several preferred embodiments of the invention.

Figure 1:
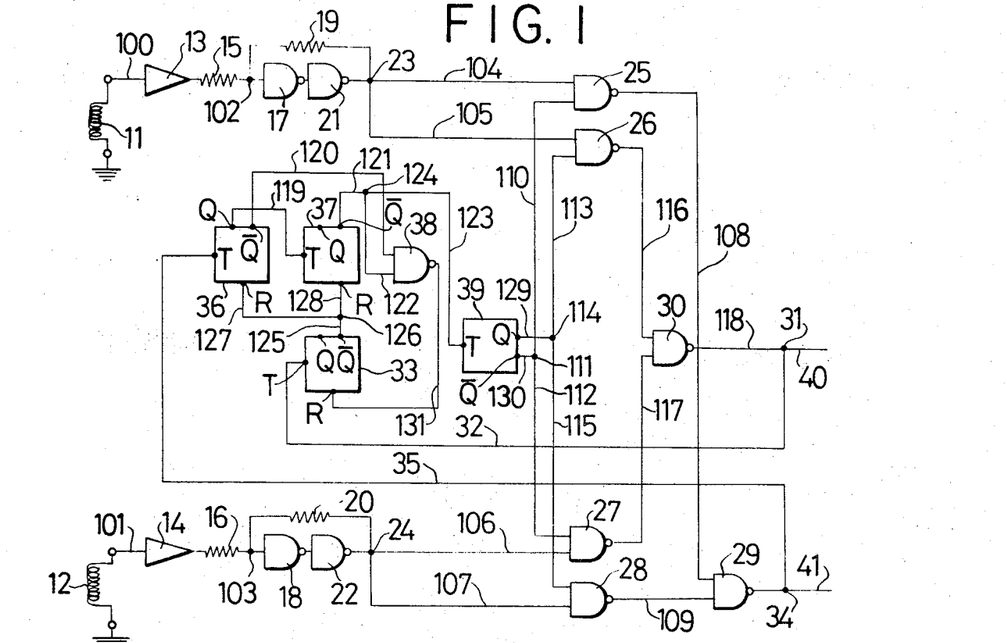
FIG. 1 is a block diagram of a first embodiment of the invention.

Referring now to the accompanying drawings, numerals 11 and 12 represent two separate sensors coupled with respective rotating members, not shown, each of which is designed and arranged to produce a plurality of pulses or sine waves per unit of time, in response to occasional and variable rotational speed of the related rotating member, such as, preferably, an automotive wheel. Each sensor may be of conventional design of photo-electric, electromagnetic or the like nautre. Or alternatively, it may comprise microswitch means as known per se. Numerals 13 and 14 represent amplifiers connected through lead means 100 and 101, respectively, with the outputs of said sensors 11 and 12; each of said amplifiers may be of the conventional design such as an operational amplifier, a linear IC-amplifier, a transistor amplifier or the like. These amplifiers are connected through resistors 15 and 15 to NAND-elements 17 and 18, respectively, and thence to further NAND-elements 21 and 22, respectively. A resistor 19 or 20 is connected across the series-connected NAND-elements 17;21 or 18;22 through junction points 102 and 23 or 103 and 24, respectively.

Junction 23 is connected through leads 104 and 105 to further NAND-elements 25 and 26 in parallel. In the similar way, junction 24 is connected through leads 106 and 107 to further NAND-elements 27 and 28 in parallel.

The outputs of NAND-elements 25 and 28 are connected to the input of NAND-element 29 through respective leads 108 and 109. The inputs of NAND-elements 25 and 27 are connected mutually through lead 110, junction 111 and a further lead 112. In the similar way, the inputs of NAND-elements are connected mutually through lead 113, junction 114 and a further lead 115. The outputs of NAND-elements 26 and 27 are connected through respective leads 116 and 117.

The output of NAND-element 30 is connected through lead 118, junction 31 and a further lead 32 to trigger terminal T of flip-flop 33. The junction 31 is connected further through lead 40 to a certain means, not shown, which is supplied with an electrical signal responsive to the highest revolutional speed of any one of the several rotational members the speed sensors of which are shown in this preferred embodiment at 11 and 12 in FIG. 1, as will be more specifically described hereinafter.

The output of NAND-element 29 is connected through junction 34 and lead 35 to a trigger terminal T of flip-flop 36. Junction 34 is connected through lead 41 to a certain means, not shown, which must be supplied with an electrical signal responsive to the lowest revolutional speed of any one of the several rotational members.

A terminal Q of said flip-flop 36 is connected through lead 119 of a trigger terminal T of a flip-flop 37. A terminal $\overline{Q}$ of flip-flop 36 is connected through lead 120 to an input of NAND- element 38. A terminal $\overline{Q}$ of said flip-flop 37 is connected through lead 121 and junction 124 to the other input of said flip-flop 38. The junction 124 is connected through lead 123 to a terminal T of a flip-flop 39. A terminal $\overline{Q}$ of said flip-flop 33 is connected through lead 125 to a junction 126 which is connected in turn through leads 127 and 128 to reset terminals R of said flip-flops 36 and 37, respectively.

A terminal Q of flip-flop 39 is connected through lead 129 to said junction 114, and a further terminal $\overline{Q}$ of the same flip-flop 39 is connected through lead 130 to said junction 111. Each of said NAND-elements has a NAND-function so called as to be described and a current amplifying function again to be described. Reset terminal R of flip-flop 33 is connected through lead 131 to the output of NAND-element 38.

Figure 4:
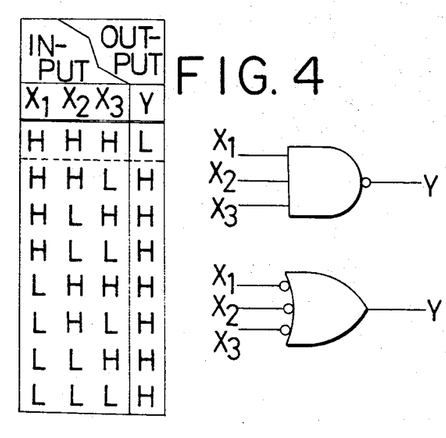
FIG. 4 shows a truth value table of a NAND-element employed in the circuit according to the invention.

The operational character of the NAND-element is selected as follows, as being representatively in FIG. 4, when representing a higher and a lower voltage than Schmidt voltage of the element by H and L, respectively, the output will become L when all the inputs are at H, while it will be H when at least one of the inputs is at L.

Figure 5:
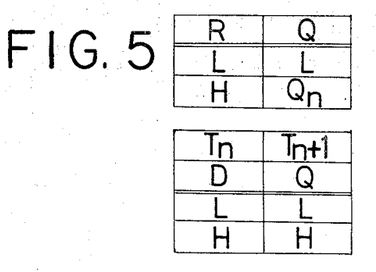
FIG. 5 shows a table of working mode of an element employed in the invention.

FIG. 5 shows the truth value table for the flip-flop.

The operation of the first embodiment of the invention so far shown and described will be described hereinbelow, by reference to further several figures.

Figure 6:
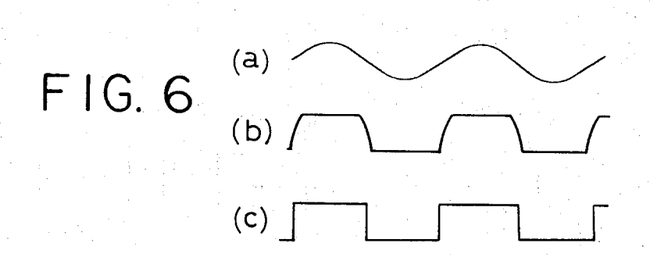
FIG. 6 is a schematic diagram of several wave forms, illustrative of the signal shaping steps starting from the revolution-sensing step.

As shown in FIG. 6 at (a), sensor 11 or 12 delivers a sinusoidal electrical signal as its output by sensing occasional revolutional speed of the related rotating member, not shown.

These sinusoidal outputs are fed to respective amplifiers 13 and 14, thus a series of amplified and shaped signals as shown representatively at (b) are delivered from each of these amplifiers to respective NAND-elements 17;21 or 18;22. The outputs delivered therefrom are shown representatively at (c) of the same figure, these output electrical signals being in the form of rectangular wave pulses. These outputs are fed to the upper inputs further NAND-elements 25 and 26, respectively.

In the similar way, similar shaped rectangular wave pulses are fed to the lower inputs of NAND-elements 27 and 29, respectively.

It is now assumed for easy and convenient understanding of the invention that the electrical potential at the terminal Q of flip-flop 39 is at the level of H, while the electrical potential at the terminal $\overline{Q}$ of the same flip-flop is at the level of L. Then, the input potentials at the other inputs of these elements 25 and 27 will be at L, respectively. Therefore, the outputs from these elements will be at H, as seen from FIG. 4. The other inputs to NAND-elements 26 and 28 will be at H, respectively. Thus, these elements 26 and 28 have H-potentials at the other inputs thereof and will deliver alternatingly repeated pulses of H and L as substantially provided from respective sensors 11 and 12, respectively.

Since NAND-element 30 receives at their respective inlets the output from NAND-element responsive to the revolutional speed of the first revolving member coupled to sensor 11, and the output H from NAND-element 27, it will deliver as per se the output pulses from NAND-element 26. In the similar way, NAND-element 29 has its inputs in the form of the output pulses from NAND-element 28; and the output H from NAND-element 25, NAND-element 29 will deliver as per se the output pulses from NAND-element 28. Therefore, NAND-element 30 delivers its output signals responsive to those from sensor 11. In the similar way, NAND-element 29 delivers its output signals responsive to those from sensor 12. Since, in the present embodiment, NAND-element 30 is connected at its output side with a means requiring high revolution- or high frequency signal, while NAND-element 29 is connected at its output side with a second means requiring the low revolutional- or low frequency signal, as was hinted hereinbefore, when sensor 11 senses a higher revolutional speed of the related revolver than that of the revolver coupled with sensor 12, the operational conditions are favorable. But, it is not convenient, however, when reversedly, sensor 12 senses a higher revolutional speed than that at sensor 11, and thus, NAND-element 30 has its output responsive to the lower revolutional speed signal sensed at sensor 11.

In order to avoid the aforementioned inconvenience, there is provided a change-over means to be described, for converting the operational mode at flip-flop 39 so as to convert the output at the terminal Q thereof into L-level and to change the output at the terminal $\overline{Q}$ into H-level. In this way, NAND-elements 26 and 28 connected with the output terminal Q of flip-flop 39 is maintained at H, and thus NAND-elements 25 and 27 have as their respective outputs the pulses coming as per se from sensors 11 and 12, respectively. Therefore, the output from sensor 12 will appear at the output of NAND-element 30 connected with NAND-element 27. In the similar way, the output from sensor 11 will appear at the output of NAND-element 29 connected with the element 25. Therefore, in this case, the output of sensor 12 now responsive to a higher revolutional speed or higher frequency will appear at the output of NAND-element 30. When the output from NAND-element 29 is that corresponding to a higher revolutional speed or a higher frequency of the revolver in comparison with the output from NAND-element 30, the operational mode of flip-flop 39 is converted in the following way.

Figure 8:
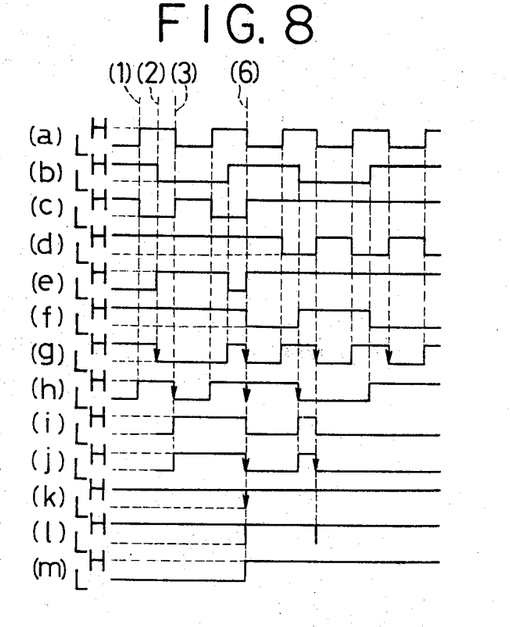

When NAND-element 21 has a higher frequency output and NAND-element 22 has a lower frequency output and the output at Q-terminal of flip-flop 39 is at L, NAND-element will deliver an output responsive to the lower frequency and the output will be conveyed through junction 31 and lead 32 to the trigger terminal T of flip-flop 33 as its input [see, FIG. 8 at (2)]. As will be clear from FIG. 8 at (i), the output of NAND-element 38 is at L and the flip-flop 33 is reset thereby, and thus, the output at $\overline{Q}$-terminal of the flip-flop will be subjected to no change. And then, by the output from NAND-element element 29 [see, FIG. 8 at (3) and (h)], the input is triggered at the trigger terminal T of flip-flop 36 which is thus converted in its operational mode, and its $\overline{Q}$- and Q-terminals will be brought to L- and H-level, respectively, when assuming that the foregoing levels have been at the reversed level conditions. Since the output from NAND-element 29 has a higher frequency than the output from NAND-element 30, the next succeedingly appearing signal part, the descending edge from H- to L-level delivered from the element 29 will trigger flip-flop 36 so as to convert its operational mode into its reversed state. Therefore, H- and L-levels at Q- and $\overline{Q}$- terminals of flip-flop 36 are converted into the respective reversed states L- and H-levels, as shown at (6) and (j), thereby the potential at $\overline{Q}$-terminal of flip-flop 37 being reversed from H to L.

With conversion of the potential level from H into L at $\overline{Q}$-terminal of flip-flop 37, flip-flop 39 is reversed in its operational mode, thus the potential level at its Q-terminal turning from L to H and that at $\overline{Q}$-terminal turning correspondingly from H to L. Thus, a higher frequency signal as an output from sensor 11 is applied through the elements 21 and 26 to the NAND-element 30, while a lower frequency signal is transmitted from sensor 12 through the elements 22 and 28 to NAND-element 29. In this way, the lead 40 is always supplied with a higher one of the sensed signals at 11 and 12.

In the case that when the output from NAND-element 21 is of a lower frequency and the output from NAND-element 22 is of a higher frequency and the output at Q-terminal of flip-flop 39 is at the level of H, the output from NAND-element 30 will also be of a lower frequency. Therefore, also in this case, the output from NAND-element 30 must be changed over to the higher frequency one.

Figure 9:
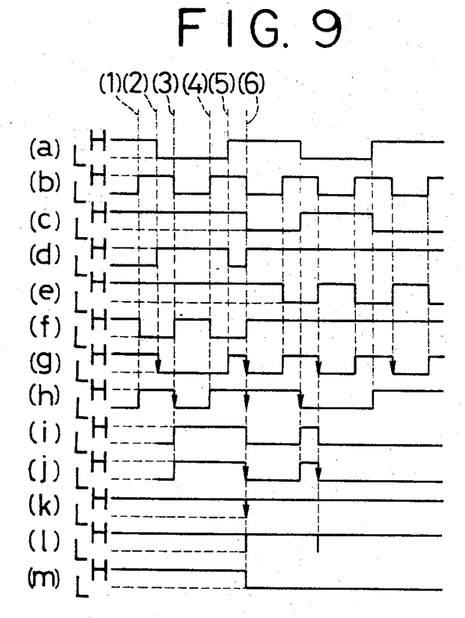

The necessary change-over operation can be performed in the following way:

The lower frequency output from NAND-element 30 is conveyed through lead 118, junction 31 and lead 32 to trigger terminal T of flip-flop 33 which is thus triggered [see, FIG. 9 at (2) and (g)].

As may be clearly seen from FIG. 9 at (i), the output from NAND-element 38 is now at the level of L by which the flip-flop 33 is reset, thus no change occurring at Q̄-terminal thereof. Then, the output from NAND-element 29 is fed to the trigger terminal T of flip-flop 36, as seen from FIG. 9 at (3) and (h), thus the latter being reversed in its operational mode and the outputs at Q and Q̄ of the flip-flop being turned to H and L, respectively, as shown in FIG. 9 at (3) and at (j). Since, in this case, the output from NAND-element 30 has a lower frequency than that from NAND-element 29, flip-flop 36 will be triggered to convert its operational mode, as shown in FIG. 9 at (6) and (j) by the now fed signal from the NAND-element 29 in the form of the descending edge from H to L as hinted in FIG. 9 at (6) and (h).

With conversion of the output from Q-terminal of flip-flop 36 from H to L, flip-flop 37 is triggered and the output from Q̄-terminal will be turned from H to L. Thus, flip-flop 39 is converted in the outputs from its terminals Q and Q̄ by virtue of the said conversion of the output at Q̄ of flip-flop 37 from H to L. More specifically, H-level signal will become L-level at the Q-terminal, while the output at Q̄ will turn from L to H. Thus, the higher frequency signal from sensor 12 will be conveyed through the elements 22;27 to NAND-element 30, while the lower frequency signal from sensor 11 will be conveyed through the elements 21;25 to NAND-element 29. Thus, it will be seen that the lead 40 will always carry the higher frequency signal.

Figure 7:
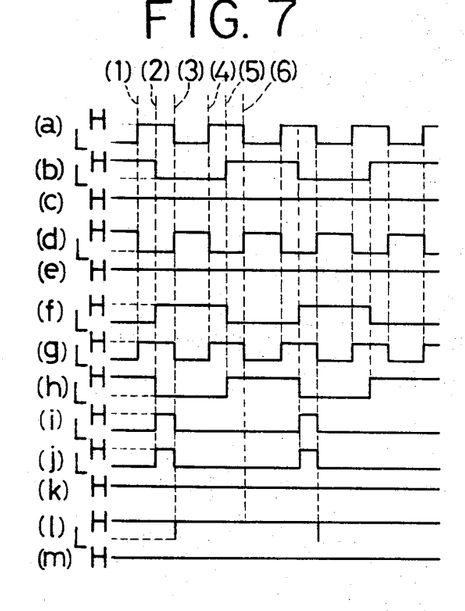
FIGS. 7–10 represent several working modes of the circuit elements employed.

In the case when the output from NAND-signal 21 is of higher frequency and that delivered from NAND-element 22 is of lower frequency and the output from Q-terminal of flip-flop 39 is at H (see, FIG. 7), a higher frequency signal output will appear from NAND-element 30. By this reason, the signal developed by the conversion of the output from NAND-element 29 from H to L, as shown in FIG. 7 at (2) and (h) will be conveyed through junction 34 and lead 35 to the trigger terminal T of flip-flop 36 which is thus triggered. At this time, if the outputs at Q- and Q̄-terminals of flip-flop 36 are at L- and H-levels, respectively, the said trigger action will turn these outputs in their reversed sense, or more specifically, to H, as shown in FIG. 7 at (2) and (j), and to L, respectively, on account of non-reset conditions of flip-flops 36 and 37.

Then, the signal developed by the output conversion at NAND-element 30 from H to L [refer to FIG. 7 at (3) and (g)], will trigger the flip-flop 33 at its T-terminal, thus its Q̄-terminal being instantly turned from H to L, thereby returning again to H. This is caused by the conversion from H to L at Q̄-terminal of flip-flop 33 under the influence of the said trigger signal input, thereby the Q̄-terminals of flip-flops 36 and 37 will become H. Thus, all the inputs to NAND-element 38 will become H. As a result, the output from NAND-element 38 will become L which is conveyed to the reset terminal R of flip-flop 33 which is thus reset, and its Q̄-terminal will go back to H-level. Naturally, all these operations are brought about almost instantly. Even if, thereafter, the output from NAND-element 30 should turn from H to L, as shown in FIG. 7 at (6) and (g), the flip-flop 33 could not be reversed in its operation [refer to FIG. 7 at (6) and (l)], because the output from NAND-element 38 is kept at L [as shown in FIG. 7 at (6) and (i)] and thus the flip-flop is in its reset condition.

Even when any output is conveyed from NAND-elements 29 and 30 to flip-flops 36;33 as trigger signal, the similar operation may be performed. Therefore, the Q-terminal of flip-flop 39 is kept at H without conversion, the output from NAND-element 30 will be kept always at a higher frequency.

Figure 10:
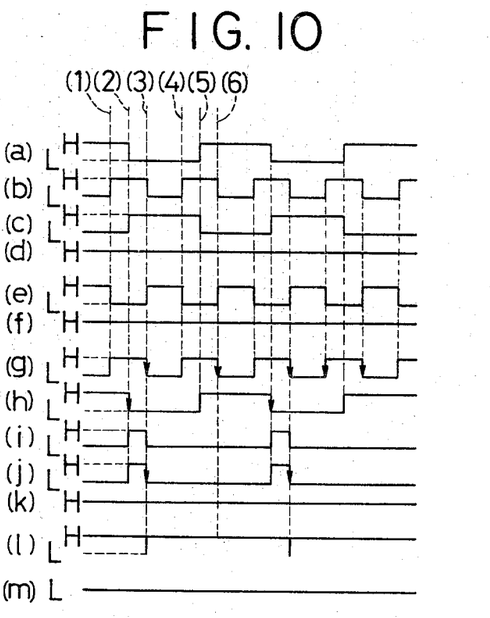

Further, in such a case when the output from NAND-element 22 is of high frequency nature and the output from Q-terminal of flip-flop 39 is at the level L (refer to FIG. 10), the NAND-element 30 which is required to deliver higher output signal level will have an output of such nature as in the case of FIG. 7. In this case, flip-flop 36 will be converted in its operational state under the influence of the converted output from H to L from NAND-element 29 [see FIG. 10, at (2) and (h)], the Q-terminal output will be turned from L to H, while flip-flop 37 will not be subjected to any conversion. Then, the output from Q̄-terminal of flip-flop 33 will be turned provisionally from H to L under the influence of the converted output from H to L NAND-element 30, as shown in FIG. 10 at (3) and (g).

Then, the outputs from the respective Q̄-terminals of flip-flops 36;37 will become H and the output from NAND-element 38 attains the lower value L which is conveyed to reset terminal R of flip-flop 33 so as to reset the latter, thereby the output from Q̄-terminal thereof returning back to H. These operations are naturally brought about almost instantly. Thereafter, even if the output from NAND-element 30 now delivering the higher output should turn from H to L, as shown in FIG. 10 at (6) and (g), the flip-flop 33 does not make any conversion, because the output from NAND-element 38 is kept at L as shown in FIG. 10 at (6) and (i) and thus the flip-flop is kept in this stage as its reset state [see FIG. 10 at (6) and (l)].

In the similar way, it will be clearly seen from the foregoing that when any output from NAND-elements 29;30 is applied to flip-flops 36;33, so as to trigger the latter, the similar operation may be invited. Therefore, the output from Q-terminal of flip-flop 39 is kept at L without making any conversion, and thus, the output from NAND-element 30 will be kept at the higher frequency signal level.

Figure 2:
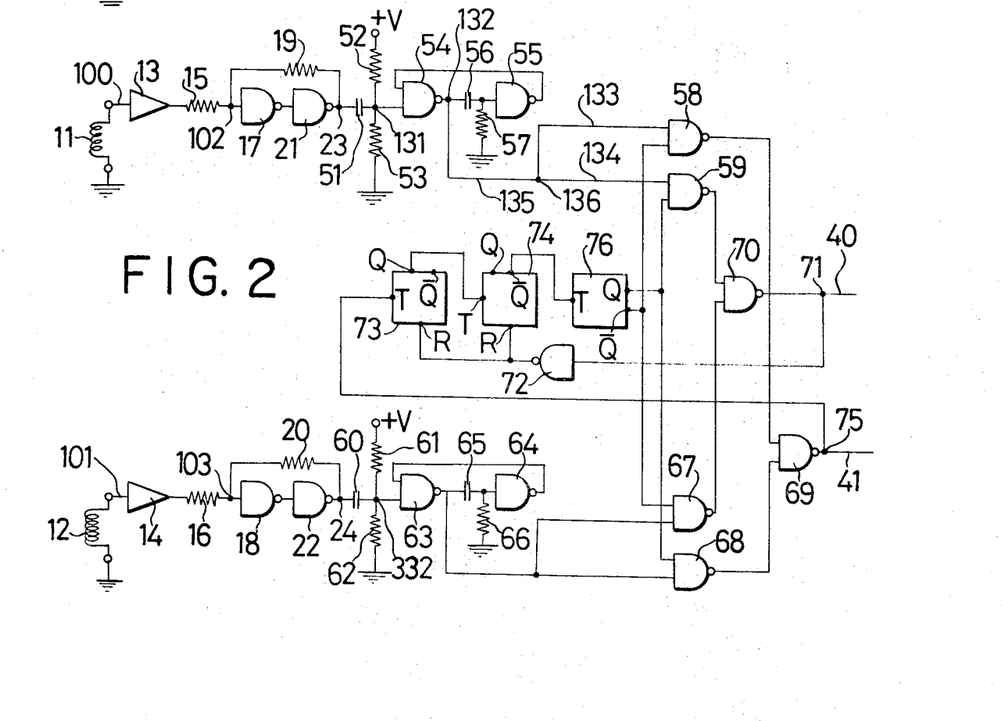
FIG. 2 is a similar view to FIG. 1, illustrative of a second embodiment of the invention.

Next, referring to FIG. 2, a preferred second embodiment will be described in detail. It should be noted that those parts of this circuit, as denoted by 11–24 and 100–103 are designed and arranged in the similar way as shown in the foregoing first embodiment shown in FIG. 1.

The outputs from sensors 11 and 12 are amplified in respective amplifiers 13 and 14, respectively, and the amplified outputs are then conveyed through the shaping NAND-elements 17;18 and NAND-elements 21;22 to the respective junction points 23 and 24.

The junction 23 is connected through a differentiating circuit comprising a condenser 51 and two resistors 52;53 arranged as shown radially around a junction point 131 as shown, to a monostable multivibrator comprising NAND-elements 54;55, condenser 56 and resistor 57, mutually connected as shown. In this multivibrator, there is provided a junction point 132 from which a lead 135 extends to a further junction 136, the latter being connected through parallel leads 133 and 134 to one side inputs of NAND-elements 58 and 59, respectively.

The junction point 24 is connected similarly to a differentiating circuit comprising condenser 60 and resistors 61 and 62; thence to a monostable multivibrator comprising NAND-elements 63;64, condenser 65 and resistor 66, the output of said multivibrator being connected in parallel with one-side inputs of NAND-elements 67 and 68, as shown.

Outputs of NAND-elements 58 and 68 are connected respective inputs of a NAND-element 69 as shown. Outputs of NAND-elements 59 and 67 are connected with respective inputs of a NAND-element 70 as shown. Output of the element 70 is connected through junction 71 and NAND-element 72 to respective reset terminals R of flip-flops 73;74.

Output of NAND-element 69 is connected through junction 75 to trigger terminal T of flip-flop 73. Q-terminal of the latter is connected to trigger terminal T of flip-flop 74, $\overline{Q}$-terminal of the latter being connected to trigger terminal T of flip-flop 76, as shown. Q- and $\overline{Q}$-terminals of flip-flop 76 are connected to inputs of NAND-elements 59;68 and 58;67, respectively. Leads 40 and 41 correspond to those shown in FIG. 1. Functions 71 and 75 correspond substantially to those at 31 and 34, respectively.

Figure 11:
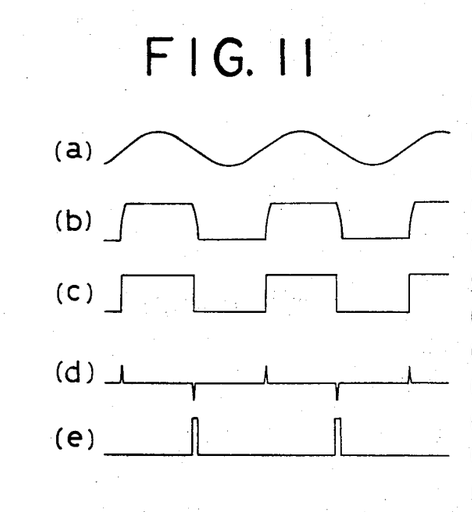
FIG. 11 shows several wave forms for illustration of several shaping steps as employed in the second embodiment.

The operation of the second embodiment so far shown and described is as follows:

The output signals from the sensors are of a sinusoidal wave as shown in FIG. 11 at (a). Upon amplified, these take substantially a form of rectangular wave signals, as shown representatively at (b) in FIG. 11.

The signal wave appearing at the output of either NAND-element 21 or 22 is shown schematically and representatively at (c) in FIG. 11. Signal form appearing at either junction 131 or 332 is shown schematically and representatively at (d) in FIG. 11.

The output signal at the output of either NAND-element 54 or 63 is shown schematically at (e) in FIG. 11.

In the present embodiment, a means which requires the higher frequency output signal, not shown, is provided at the output side of NAND-element 70, as in the foregoing first embodiment. In the similar way, a means which requires the lower frequency output signal is provided at the output side of NAND-element 69, although not shown.

There must be, therefore, provided change-over means adopted for bringing and keeping the outputs from NAND-elements 69 and 70 to and at the higher frequency signal, respectively, in case where the output from NAND-element 70 is of lower frequency mode or the output from NAND-element 69 is of higher frequency mode.

Now assuming such case where the output from sensor 11 or more specifically NAND-element 21 is of higher frequency mode; the output from sensor 12 or more specifically NAND-element 22 is of lower frequency mode; and the Q-terminal output of flip-flop 76 is at L, then, since the outputs from the elements 59 and 68 are always at H, and thus, the output from NAND-element 21 will become the output from the element 58 through the element 54, thus serving as the input signal to NAND-element 69. In the similar way, the output from NAND-element 22 will act through the element 63 as the output from NAND-element 67, and thus as the input to the element 70. Therefore, a lower frequency signal will be conveyed from the output of the latter, while a higher frequency signal will be delivered from the output of NAND-element 69.

Figure 12:
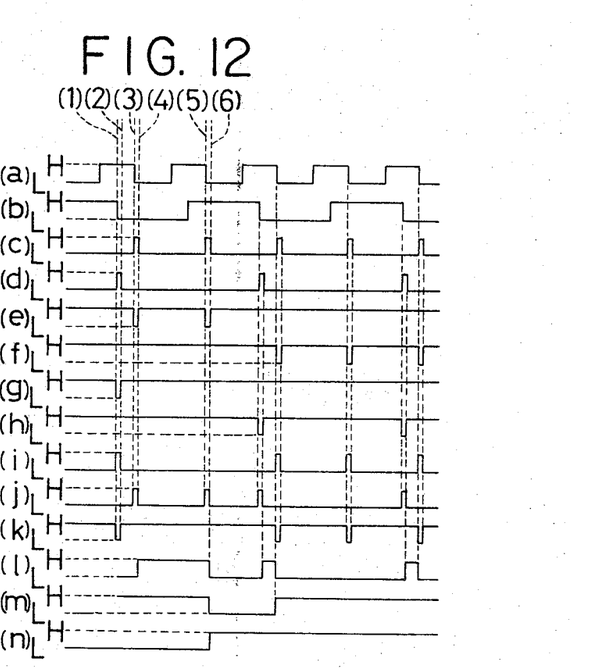
FIGS. 12–15 are several working diagrams for the second embodiment.

However, in this case, the output from NAND-element 70 is subjected to conversion through the element 72, to the level of L, as shown in FIG. 12 at (1), (2) and (k). If flip-flops 73 and 74 have been reset and any reset signal has delivered from NAND-element 72, thus the output being at H, and two or more successive output signals from NAND-element 69, as hinted in FIG. 12 are applied to flip-flop 73 so as to trigger the latter, then, the Q-terminal output of flip-flop 73 will become L-H-L (as seen from FIG. 12 at (4) and (6) and (l). Therefore, flip-flop 74 is triggered, and the Q-terminal output thereof will be converted from H to L, as seen from FIG. 12 at (6) and (m). Then, Q- and $\overline{Q}$-terminal outputs of flip-flop 76 are reversed respectively. More specifically, the output from Q will be turned from L to H, while the output from $\overline{Q}$ will become from H to L.

As a result, the output signal, in the form of higher frequency mode at this stage, from sensor 11 is conveyed through NAND-elements 21, 54 and 59 to the element 70, from which it is delivered further. In the similar way, the signal from sensor 12 which now delivers a lower frequency mode signal, is conveyed through elements 22, 63 and 68 to NAND-element 69 from which it is further delivered.

Figure 13:
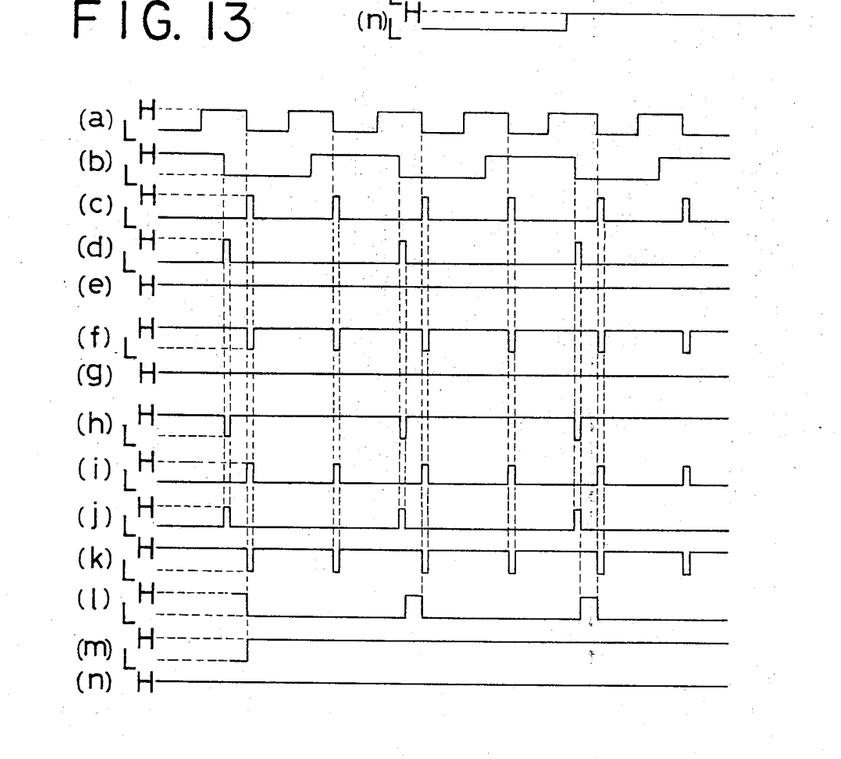

In such a case where the output from NAND-element 21 is of higher frequency mode and the output at Q-terminal of flip-flop 76 is at H, then, the output from NAND-element 70 is of higher frequency mode and conversely, the output from NAND-element 69 will be of lower frequency mode, then, the Q- and $\overline{Q}$-terminal outputs of flip-flop 76 will be maintained without conversion, as seen from FIG. 13.

In a further case, where output NAND-element 21 is of lower frequency mode, while the output from element 22 is of higher frequency mode, and Q-terminal output from flip-flop 76 is at H, the output from NAND-element 70 will be of lower frequency and the output from NAND-element 69 will be of high frequency mode; the results would be inconvenient for the purpose of the invention.

By adopting the following measure, this inconvenience can be overcome by the change-over operation of the similar nature as was referred to hereinbefore, being adopted for converting the Q-terminal output of flip-flop 76. More specifically, when the output from NAND-element 70 [refer to FIG. 14 at (1) and (2) and (*i*)] has been converted through NAND-element 72 and an output is delivered from the outlet of NAND-element 69 [refer to FIG. 14 at (3) and (4) and (*j*)], the Q-terminal output of flip-flop 73 will be converted from L to H, as shown in FIG. 14 at (4) and (1).

Figure 14:
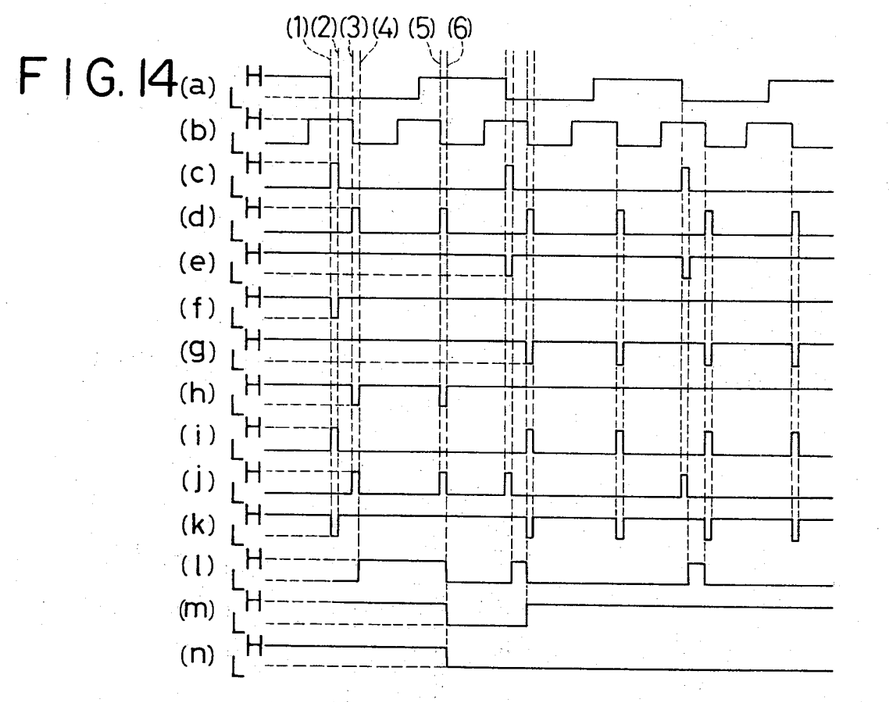

When an output from NAND-element 69 [refer to FIG. 14, at (6) and (*j*)] is delivered, flip-flop 73 will convert its operating mode, thus the Q-terminal output will become from H to L and a trigger input is applied to the trigger terminal T of flip-flop 74, thereby the latter being converted and the $\overline{Q}$-terminal output becoming now from H to L [refer to FIG. 14 at (6) and (*m*)].

With conversion of the output at $\overline{Q}$-terminal of flip-flop 74 converted from H to L, the output from Q-terminal of flip-flop 76 will be converted from H to L [refer to FIG. 14 at (6) and (*n*)].

As a result, the output from sensor 11 which is delivering a lower frequency mode signal, is conveyed through the elements 21, 54 and 58, and an input will be applied to NAND-element 69; thence, and an output will be delivered therefrom. On the other hand, a high frequency mode signal from sensor 12 will be conveyed through the elements 22, 63 and 67 to NAND-element 70 which delivers thus an output.

Figure 15:
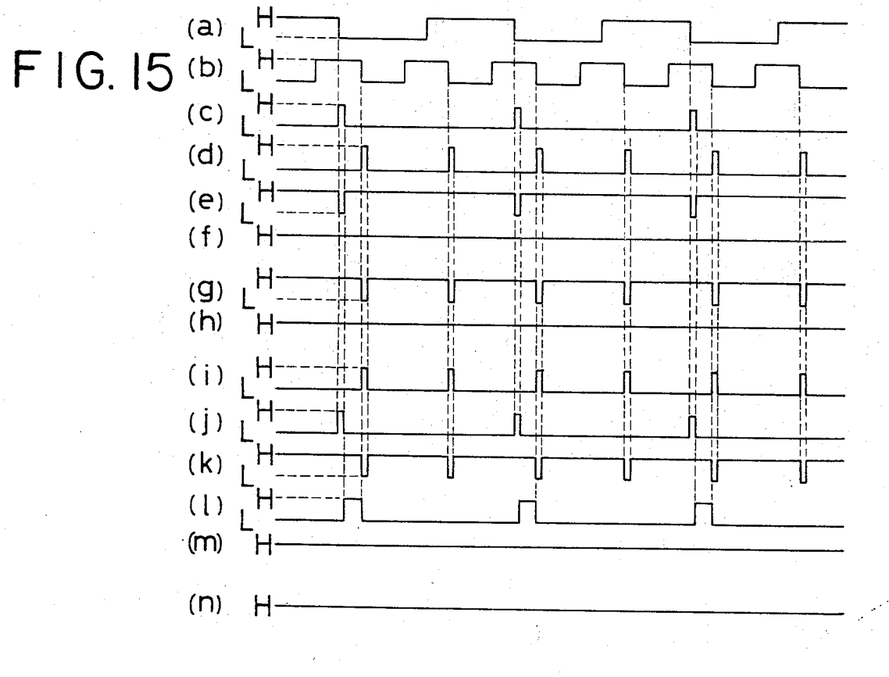

In the case where the output from NAND-element 21 of lower frequency mode, the output from NAND-element 22 is of higher frequency mode and the Q-terminal output of flip-flop 76 is at L (refer to FIG. 15), then a high frequency output signal will appear at NAND-element 70, while a low frequency output signal will appear at NAND-element 69. In the similar manner as the case of FIG. 13, the output at Q-terminal of flip-flop 76 will not thus be converted.

A third embodiment of the invention as applied to an anti-skid brake system will now be described hereinbelow in detail by reference to FIG. 3.

In this embodiment, lead 40 and 41 are of the similar nature to those denoted with 40 and 41 in the foregoing two embodiments in such that the lead 40 is supplied always with the higher frequency input while the lead 41 is supplied always with the lower frequency input.

Lead 40 is connected with the trigger terminal T of a flip-flop 201, the Q-terminal of which is connected with trigger terminal T of flip-flop 202 and with an input of NAND-element 203. $\overline{Q}$-terminal of flip-flop 201 is connected with an input of NAND-element 204. Q-terminal of flip-flop 202 is connected with trigger terminal T of flip-flop 205, while $\overline{Q}$-terminal is connected with respective inputs of NAND-elements 203, 204 and 206.

Q-terminal of flip-flop 205 is connected with trigger terminal T of flip-flop 207, while $\overline{Q}$-terminal is connected with respective inputs of NAND-elements 203, 204 and 206. Flip-flops 201, 202, 205 and 207 constitute in combination a first counter, as will become more apparent as the description proceeds.

$\overline{Q}$-terminal of said flip-flop 207 is connected with respective inputs of NAND-elements 203, 204 and 206. Output of NAND-element 204 is connected with trigger terminal T of flip-flop 208, and output of NAND-element 203 is connected respective reset terminals R of flip-flops 209, 210, 211 and 212 which constitute in combination a second counter.

Output of NAND-element 206 is connected with an input of NAND-element 213. The other input of the latter is connected with lead 41. Output of NAND-element 213 is connected with trigger terminal T of flip-flop 209. Q-terminal of the latter is connected with trigger terminal T of flip-flop 210 and Q-terminal of this flip-flop 210 is connected with trigger terminal T of flip-flop 211, Q-terminal of the latter being connected with trigger terminal T of flip-flop 212, and with an input of NAND-element 214.

Q-terminal of flip-flop 212 is connected to the other input of NAND-element 214, the output of the latter being connected with a terminal D of flip-flop 208. Q-terminal of the latter is connected through resistor 215 to the base of transistor 216, and with one of inlets of NAND-element 217. The collector of transistor 216 is connected through resistor 218 to the source voltage, and through resistor 219 to the base of transistor 216 is connected with an earth conductor 221. Emitter of transistor 220 is connected with the source voltage, while the collector terminal of the same transistor is connected with a solenoid coil 222 which is arranged to actuate a valve adapted for increase or decrease of hydraulic pressure of an automotive vehicle braking system, not shown. This arrangement is designed and arranged in such way that with energization of solenoid coil 222, the valve is actuated so as to reduce the hydraulic brake pressure and on the contrary, with de-energization of the solenoid, the brake pressure is increased.

Q-terminal of flip-flop 208 is connected with an input of NAND-element 223, the output of the latter being connected through condenser 124 to NAND-element 225 and resistor 226 earthed.

Output of NAND-element 225 is connected the other input of NAND-element 217, and with the other input of NAND-element 223.

Output of NAND-element 217 is connected reset terminal R of flip-flop 208. NAND-elements 223 and 225. condenser 224 and resistor 226 consist in combination a mono-stable multivibrator.

Figure 3:
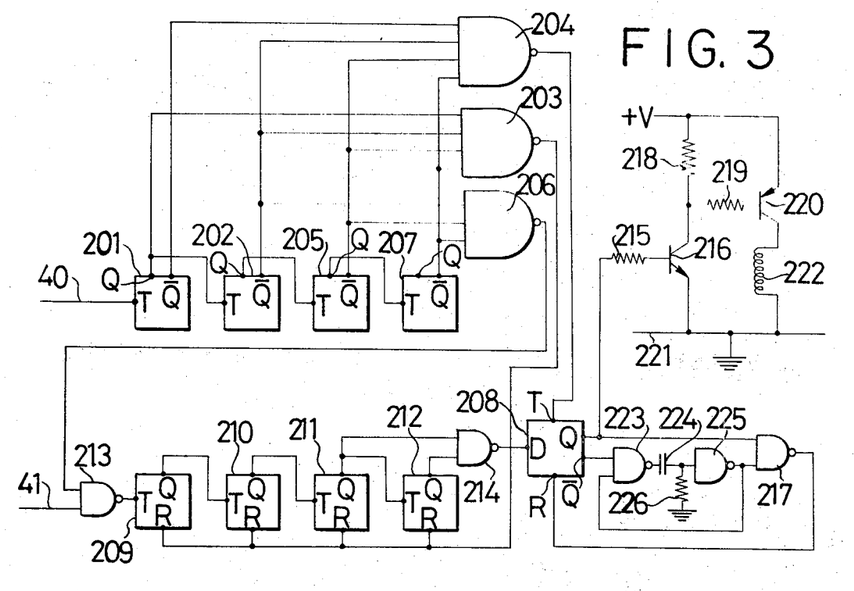
FIG. 3 is a similar view to the foregoing, illustrative of the invention, as being applied to an antiskid brake arrangement.
Figure 16:
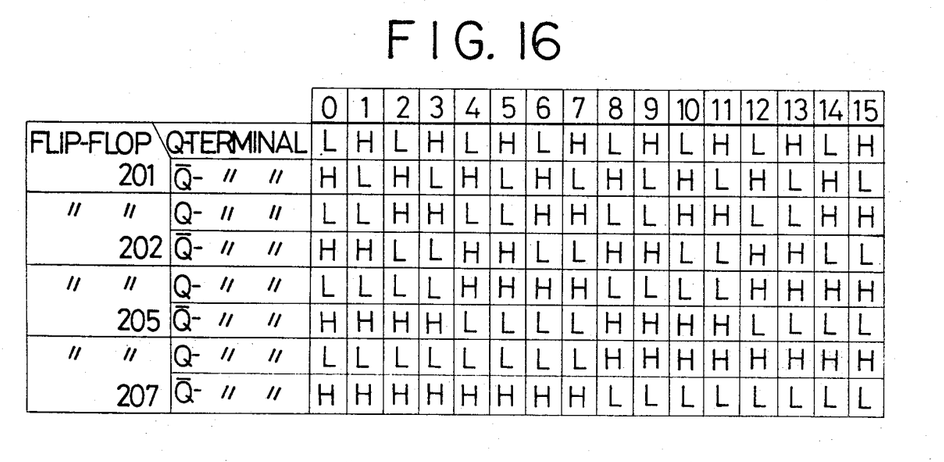
FIG. 16 is a working diagram of the first counter.

The operation of the embodiment shown in FIG. 3 is as follows:

In this embodiment, the first counter comprising flip-flops 201, 202, 205 and 207 is arranged to count the number of pulses responsive to the higher speeded one of the rear wheels of the vehicle, as being hinted in FIG. 16.

Figure 17:
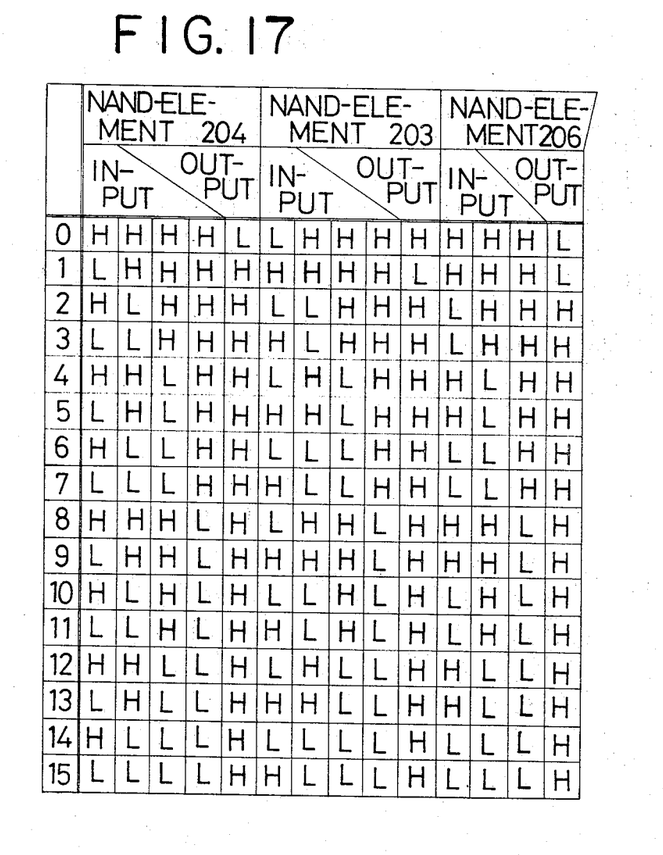
FIG. 17 is an explanatory diagram showing the working mode of a NAND-element.

It will therefore be seen as from FIG. 17 that the output from NAND-element 204 is L at O-th signal and the output from NAND-element 203 is L at 1st signal. The outputs from NAND-element 206 will be H at 2nd-15th signals.

Figure 18:
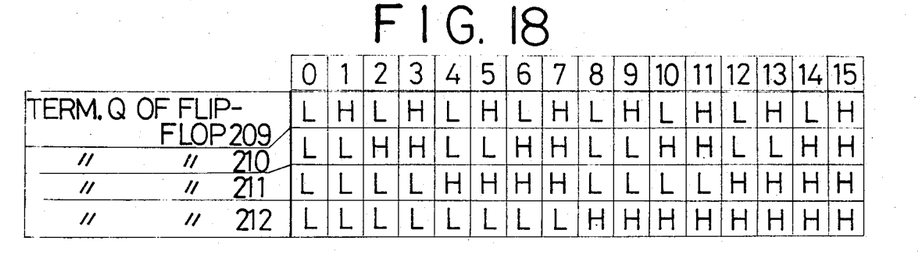
FIG. 18 is that for a NAND-element.

Sensed and shaped signals responsive to lower revolutional speed of one of the automotive rear wheels and appearing on the lead 41 are counted at the second counter comprising flip-flops 209-212 as shown in FIG. 18, when the output from NAND-signal is at H.

Outputs from NAND-element 214 will be H for 0-11th signals at the second counter and be L for 12-15th signals.

With the output from NAND-element 203 being L, the second counter is reset and the operational conditions will become back to those for 0-th signal.

With the output from NAND-element 204 being L, output from NAND-element 214 connected with the D-terminal of flip-flop 208 will appear as the output at the Q-terminal. As an example, when the output from NAND-element 214 is H, the Q-terminal of flip-flop 208 will be at H and vice versa. With the output from NAND-element 204 being at H, the output will be unchanged as for the output from the same element 204 being at L.

When the output at the Q-terminal of flip-flop 208 is at H, transistors 216 and 220 become conductive so that solenoid 222 is energized for reducing the hydraulic brake pressure in the brake system not shown. On the contrary, when the output at the Q-terminal of flip-flop 208 being at L, transistors 216 and 220 will become non-conductive so that solenoid coil 222 is de-energized for recovery of the hydraulic brake pressure.

When the state of H at the Q-terminal of flip-flop 208 is maintained, depend upon the operational modes of the mono-stable multivibrator and NAND-element 217, longer than the time period established by the mono-stable multivibrator, the flip-flop 208 is reset and the output therefrom at its Q-terminal is forcibly turned to L. By the high revolutional signal pulses sensed relative to the high speed one of the rear wheels and transmitted, upon processed in the foregoing way, to the first counter, the output from NAND-element 203 becomes L at arrival of the first pulse, so as to reset the second counter. During reception of signal pulses for fourteen counts ranging from the second to 15th count at the first counter, the lower revolutional signals for the remaining one of the rear wheels will be counted by the second counter. By the count of the first counter at 0-th signal pulse, the state of NAND-element 214 is memoried at the Q-terminal of flip-flop 208. More specifically, when the second counter counts more than 12 counts of the lower revolutional rear wheel pulses during the period of counting at the first counter at which 14 counts have been made of the higher revolutional rear wheel signal pulses, NAND-element 214 will be turned to L and Q-terminal thereof will be equally at L, while the Q-terminals of flip-flops 211 and 212 are kept at H, as will be clearly seen from FIG. 18.

The aforementioned L-state will then be maintained for recovery of the hydraulic brake pressure until a new information will have arrived at the first counter by counting a 0-th count again thereat.

On the contrary, when the second counter has counted 11 pulses or less than 11 pulses of the lower revolutional wheel signals during counting of 14 counts of the higher revolutional wheel signals at the first counter, NAND-element 214 will become the state of H and the Q-terminal of flip-flop 208 is kept also at H so as to maintain the state of H for reducing the hydraulic brake pressure, until the first counter will count a next 0-th pulse for introducing a new information.

Should the pressure-reducing period continue longer than the established period by the mono-stable multivibrator (metastable period), flip-flop 208 is caused to reset and the hydraulic brake pressure is forcibly increased in its recovering sense.

Therefore, it will be seen that in case of the automotive vehicle kept at its stopped condition or directly therebefore, a brake pressure-restoration signal will develop without fail, so as to avoid a non-braking condition of the braking system.

In the foregoing embodiment, the ratio of the lower revolutional signal counts to the higher revolutional signal counts has been set to 12/14 or larger for issuing a pressure recovery instruction signal, while a pressure reduction instruction signal is delivered when the ratio becomes equal to 11/14 or less. It should be noted, however, these specific values of the ratio are only illustrative and can be modified depending upon the types and models of the vehicle, expected conditions in the use thereof, and the like.

Finally, a further embodiment of the invention which has been applied to the vehicle brake pressure control unit (P. C. V.) will be described hereinbelow by reference to FIGS. 19 and 20.

Figure 19:
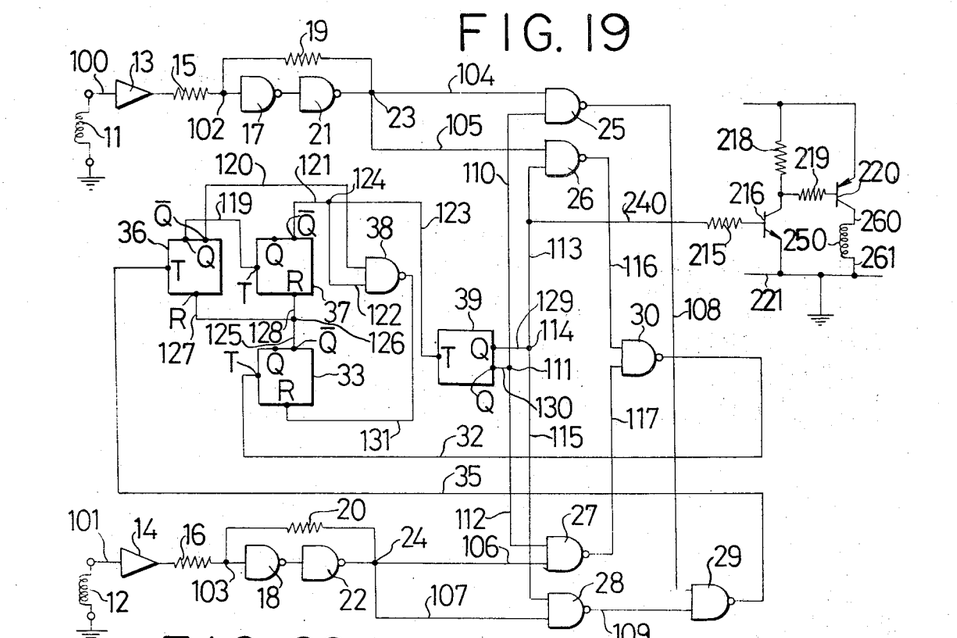
FIG. 19 represents a forth embodiment of the invention, as being applied to a pressure-control valve arrangement.

In the arrangement shown in FIG. 19, the Q-terminal of flip-flop 39 shown in FIG. 1 has been connected to the base electrode of transistor 216 shown in FIG. 3. The only difference from the arrangements shown in FIGS. 1 and 3 resides in that sensor 11 is coupled with a rear vehicle wheel, not shown, and sensor 12 is coupled with a front vehicle wheel, again not shown, and that leads 40 and 41 have been abolished and the object to be controlled is a P. V. C. shown in FIG. 20.

In the following description, same or similar parts as employed in the arrangements of FIGS. 1 and 3 will be mentioned with respective same reference numerals for easier understanding of the invention.

In the present embodiment, the Q-terminal of flip-flop 39 is connected through lead 240 and resistor 215 to the base of transistor 216, the collector of the latter being connected through resistor 218 to a voltage source, not shown, and through lead 219 to the base of transistor 220. Numeral 250 represents a solenoid coil which is adapted for the control of a valve assembly 151 having a solenoid coil 15. This solenoid 150 is energized in case of the output at the Q-terminal of flip-flop 39 being at H and the transistors 216 and 220 being kept in their conducting state by the operating as set forth hereinbefore with reference to FIG. 3.

Now there will be described the detailed structure of actuator 152 and the valve assembly 151 operatively connected therewith.

Figure 20:
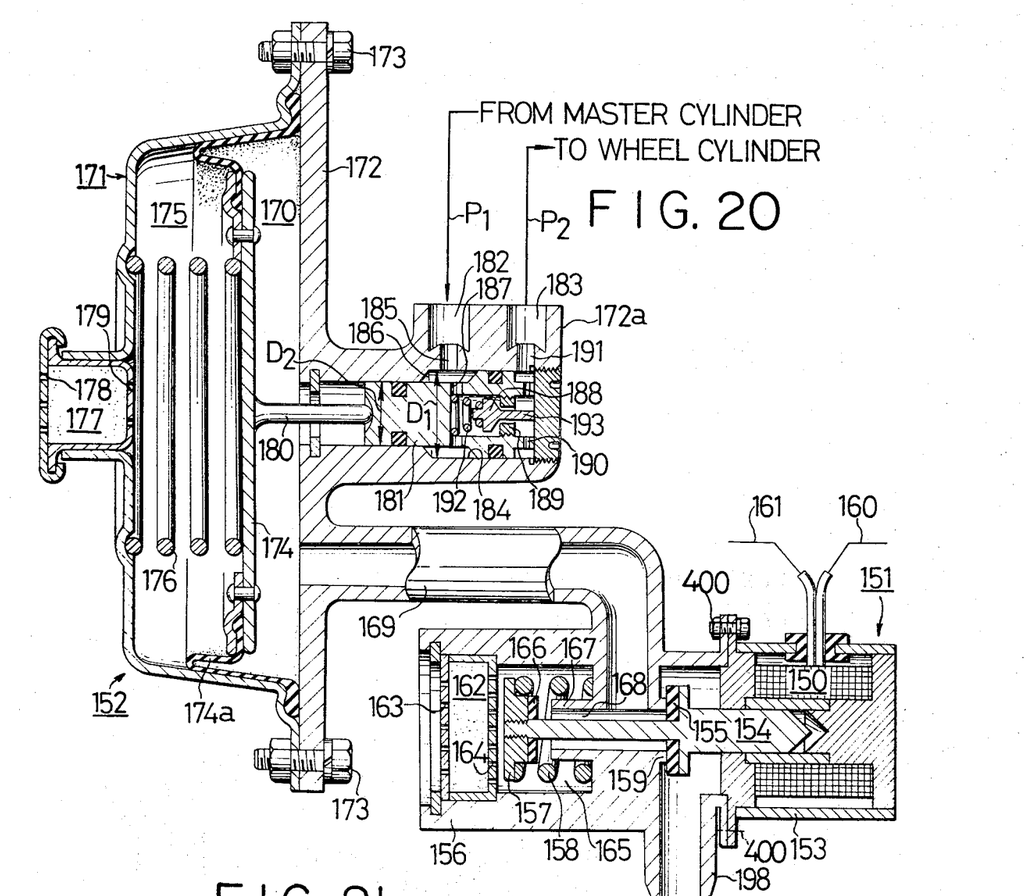
FIG. 20 is a sectional figure of an actuator and valve body as employed in FIG. 19.
Figure 21:
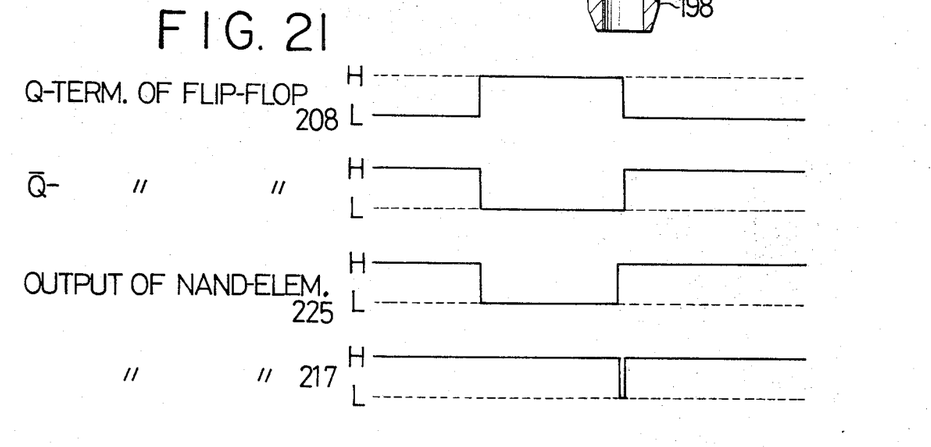
FIG. 21 is an explanatory drawing of a flip-flop element.

Solenoid 150 is housed concentrically and stationarily in a cover 153, a plunger 154 being mounted as shown in an axially and concentrically slidable manner as shown.

A valve member 155 is formed rigidly with the plunger 154 and at an intermediate point between the both end extremities thereof. With the solenoid 150 being kept in its de-energized state, the valve member 155 is kept in pressure engagement with a valve seat 159 formed on an inside part of a stationary housing 156 coupled rigidly at 400 with said cover 153, under the influence of an urging coil spring 158 which is kept in its pre-compressed state between a spring mount 157 formed on the left-hand end of said plunger and the said housing.

Solenoid 150 is fitted with a pair of out-going leads 160 and 161 which are connected with the collector of transistor 220, and with the earth conductor 221 shown in FIG. 19, respectively, although not specifically shown.

An air filter unit 162 is contained within the interior space of the housing 156 and formed at both sides two sets of small passage openings 163 and 164, respectively, for allowing introduction of ambient atmospheric air into the interior chamber at 165 of the housing 156.

A resilient valve member 166 is attached to the inside surface of said spring mount 157 and normally kept in separation from a mating valve seat 167 formed on an inner part of the housing 156 when the solenoid 150 is kept in its de-energized position as shown. Under these conditions, ambient atmospheric air is kept in fluid communication through the filter 162, the chamber 165 and ducts 168 and 169 to a chamber 170 formed within the actuator 152. In this actuator 152, servo-motor unit 171 and a main body 172 of the P.C.V. -unit are rigidly attached with each other by means of conventional fixing means, such as bolt-and-nut units 173 as shown.

A movable diaphragm piston 174 is provided within the interior of the assembly 171;172, said piston 174 having its resilient skirt 174a squeezedly fixed between the unit 171 and the main body 172 as shown. By this provision of piston 174, the said interior space is divided into two chambers 170 and 175.

An urging spring 176 is provided in the chamber 175 under compression between the serve-motor unit 171 and the piston 174, so as to resiliently urge the latter to move rightwards in FIG. 20. An air filter unit 177 of the conventional design is attached to the servomotor 171 and formed at its both sides with small passage openings 178 and 179, respectively, so as to establish a permanent fluid communication of the chamber 175 with the ambient atmosphere.

A piston rod 180 is fixedly attached to diaphragm piston 174 and kept normally in pressure contact with the left-hand end of a stepped piston 181 which is slidably received in a stepped cylinder bore 184 formed in a projecting part 172a of the main body 172.

Ports 182 and 183 are formed through the wall of said projecting part 172a and kept in fluid communication with the master cylinder and the wheel cylinder, although not specifically shown.

Hydraulic pressure coming from the master cylinder is normally conveyed through port 182, a passage 185 kept in communication therewith, a ring space 186, a lateral passage 187 formed through piston 181, valve gap between 188 and 189, a lateral passage 190 bored through piston 181, a connection passage 191 and the port 183 to the wheel cylinder, as may be well obserbed from FIG. 20.

A spring 192 is provided in a chamber 193 formed within the piston 181 and kept in position under preloading between the piston and an axially extending valve member 188 and mounted within the piston. Valve 188 is formed with a stem 193 which is normally kept in separated relationship from a seat member 189 in case of no supply of hydraulic pressure from the master cylinder, said seat member 189 being held in position within the interior of said piston 181 by screwing.

The P.C.V. -unit is so designed and arranged as commonly known that the hydraulic brake pressures supplied to the front and rear wheel pairs of the vehicle are kept equal to each other until the hydraulic pressure is below a certain pressure level, and that upon exceeding such pressure level, the brake pressure distribution between the front and rear wheel pairs are varied automatically for avoiding a possible rear wheel lock, so as to realize an idealized brake pressure distribution characteristics as possible and to attain a shortest possible brake distance when measured from the initiation of a brake application to dead stoppage of the vehicle.

Caused by possible wearing difference between the front and rear wheels, a possible variation in the adhesive coefficient appearing between the wheel and the traveling surface and the invitation of a fading phenomenon, it is frequently experienced with occurence of an appreciable difference between the rotational speeds of the rear and front wheels. As an example, when the rear wheels rotate slower than the front wheels, it means that a correspondingly stronger braking action is being applied to the rear wheels than the front wheels, so that the aforementioned critical point for initiation of a varied brake pressure distribution must be shifted to a higher level than before. If, conversely, the rear wheel rotate at a higher speed than the front wheels, the said critical point should be shifted to a lower level.

It is now assumed that the revolutional speed of the rear wheels is higher than the front wheels during a brake application period. In this case, the output of the Q-terminal of flip-flop 39 is kept at the level of H and thus, transistors 216 and 220 are now conducting, so as to energize the solenoid 150. With energization of this solenoid, plunger 154 is caised to move rightwards in FIG. 20 against the action of spring 158 and the atmospheric valve 166 is brought into its interrupting position, while vacuum valve 155 is caused to open.

As a result, vacuum pressure coming from the passage 198 which is connected with the engine intake manifold, not shown, is conveyed through duct 169 to the chamber 170 of actuator unit 152, thereby a pneumatic pressure difference being created across the diaphragm piston 174. This pneumatic pressure difference, being with spring force 176, will be conveyed to piston rod 180 connected with diaphragm piston 174, thereby the stepped piston 181 being urged to move rightwards in FIG. 20.

In this case, even when the master cylinder pressure attains at the predetermined value, the cut-off valve 188 is not closed. This valve 188 is caused to close only after the hydraulic brake pressure becomes equal to the counter-acting spring pressure added with the pneumatic pressure difference. This means that the critical point for the variation of the hydraulic brake pressure distribution has been shifted to a certain higher level, and vice versa.

The number of the rotating members is not limited to two, but can be increased to more.

Figure 22:
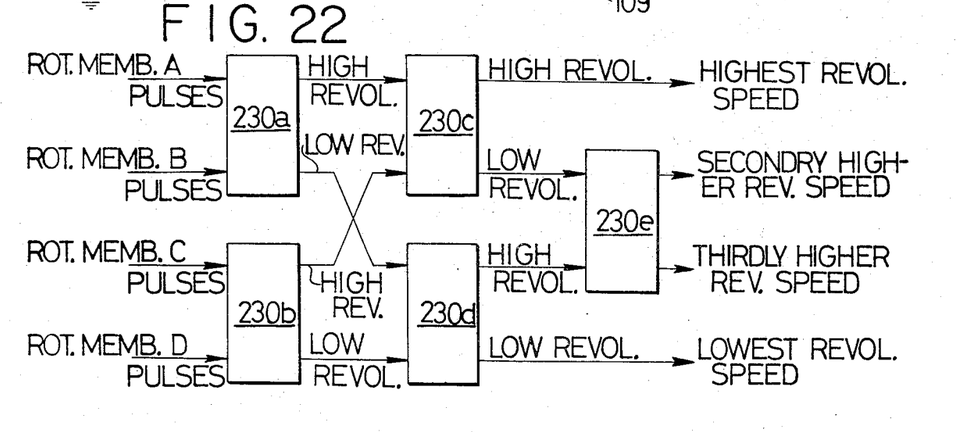
FIG. 22 represents a modification.

By use of the modified arrangement shown in FIG. 22, a similar discriminating function as before can be attained relative to more than three rotating members. In this modified arrangement, five circuits as that shown at 230 are employed for treating four rotating members, hinted at A, B, C and D in FIG. 22, so as to relative speed differential among these rotating members. These circuits are shown at 230a, 230b, 230c, 230d and 230e, respectively. The overall arrangement as well as its functions may be self-explanatory at a glance of FIG. 22 in condideration of the foregoing detailed description of the preferred foregoing embodiments, and without further detailed analysis.

The embodiments of the invention in which an exclusive property or privilege is claimed are as follows:

1. A method for the discrimination of the relative rotational variable speeds of a plurality of rotating members, comprising in combination the following steps:
    generating a first signal series of pulses having a frequency responsive to the actual speed of one of said rotating members;
    generating a second signal series of pulses having a frequency responsive to the actual speed of the other one of said rotating members;
    sensing the existence of two or more pulses of one of said signal series between two successive pulses of the other signal series, for determining the relative rotational speeds of said members;

conveying automatically the signal pulse series relating to the higher speed rotating member to a first terminal for high speed output use; and conveying automatically the signal pulse series relating to the lower speed rotating member to a second terminal for low speed output use.

2. A system for the discrimination of the relative rotational variable speeds of a plurality of rotating members, comprising in combination:

first means for generating a first signal series of pulses having a frequency responsive to the actual speed of the one of said rotating members;

second means for generating a second signal series of pulses having a frequency responsive to the actual speed of the other one of said rotating members;

gate means having at least first, second and third inputs and first and second outputs, said first input being connected with either of said outputs, said third input being connected with the remaining one of said outputs;

first connection means for connecting said first means to said fitst input of said gate means;

second connection means for connecting said second means with said third input of said gate means;

control means connected with said first and third outputs of said gate means for generating a change-over signal when there are two or more pulses appearing at said second output of said gate means between two successive pulses appearing at said first output of said gate means; and said second input of said gate means receiving said changeover signal for selective connection of said first input with either of said first or second outputs and of said third input with either remaining one of said first or second outputs, whereby said first output automatically delivers a high frequency pulse series upon comparison between said first and second means, and said second output automatically delivers the remaining or low frequency pulse series.

3. The system of claim 2 wherein said control means comprises:

first flip-flop means connected to said second output, said flip-flop means having at least two output terminals;

second flip-flop means connected with either one of said output terminals of said first flip-flop means;

third flip-flop means connected with said first output of said gate means for generating a reset signal for said first and second flip-flop means;

logic means connected with the other of said output terminals of said first flip-flop means and with the output terminal of said second flip-flop means, for generating a reset signal for said third flip-flop means; and fourth flip-flop means connected with said output terminal of said second flip-flop means for generating said change-over signal.

4. The system of claim 2 wherein each of said first and second means comprises:

a sensor for sensing the rotational speed of one of said rotating members and for generating a series of pulse signals responsive thereto, and a sharper circuit connected with said sensor and for shaping said generated pulse signal series.

5. The system of claim 4 further comprising first and second differentiating circuits for differentiating the respective outputs of the shaper circuits, the output of said first differentiating circuit being connected to said first input of said gate means, and the output of said second differentiating circuit being connected to said third input of said gate means.

6. The system of claim 5 wherein said control means comprises:

first flip-flop means connected with said second output of said gate means;

second flip-flop means connected with the output of said first flip-flop means;

logic means connected with the first output of said gate means for generating a reset signal for said first and second flip-flop means; and third flip-flop means connected with the output of said second flip-flop means for generating said change-over signal.

7. The system of claim 2 wherein said gate means comprises:

first and second twin-input gates, one of the inputs of each of these gates receiving output pulses from said first means, the other input of each of said gates receiving said change-over signal from said control means;

third and fourth twin-input gates, one of the other of each of these gates receiving output pulses from said second means, the input of of each of these gates receiving said change-over signal from said control means;

a fifth twin-input gate having its inputs connected with the respective outputs of said second and third gates, said fifth gate having said first output for the delivery of high frequency signal pulse series; and sixth twin-input gate having its inputs connected with respective outputs of said first and fourth gates, said sixth gate having said second output for delivering said low frequency signal pulse series.

8. The system of claim 2 further comprising:

a first counter circuit connected with said first output of said gate means for counting the revolutions of the higher speed rotating member;

a second counter circuit connected with said first counter and said second output of said gate means for counting the revolutions of the lower speed rotating member during the counting period of said first counter;

a comparator circuit for comparing the counts in both counters; and a control circuit for controlling the rotational speeds of both said rotating members in response to the results of the comparison by said comparator circuit.

9. The system of claim 2 further comprising:

a hydraulic braking circuit correlated with said first rotating member for controlling the rotational speed of the latter;

a pressure control valve means inserted in said braking circuit for reducing the output pressure-rising ratio relative to the input pressure-rising ratio upon arrival of the hydraulic circuit pressure at a predetermined level;

servo means connected with said pressure control valve means so as to make said predetermined level variable; and a change-over valve for actuating said servo means in response to said change-over signal from said control means.

* * * * *